UNITED STATES PATENT OFFICE.

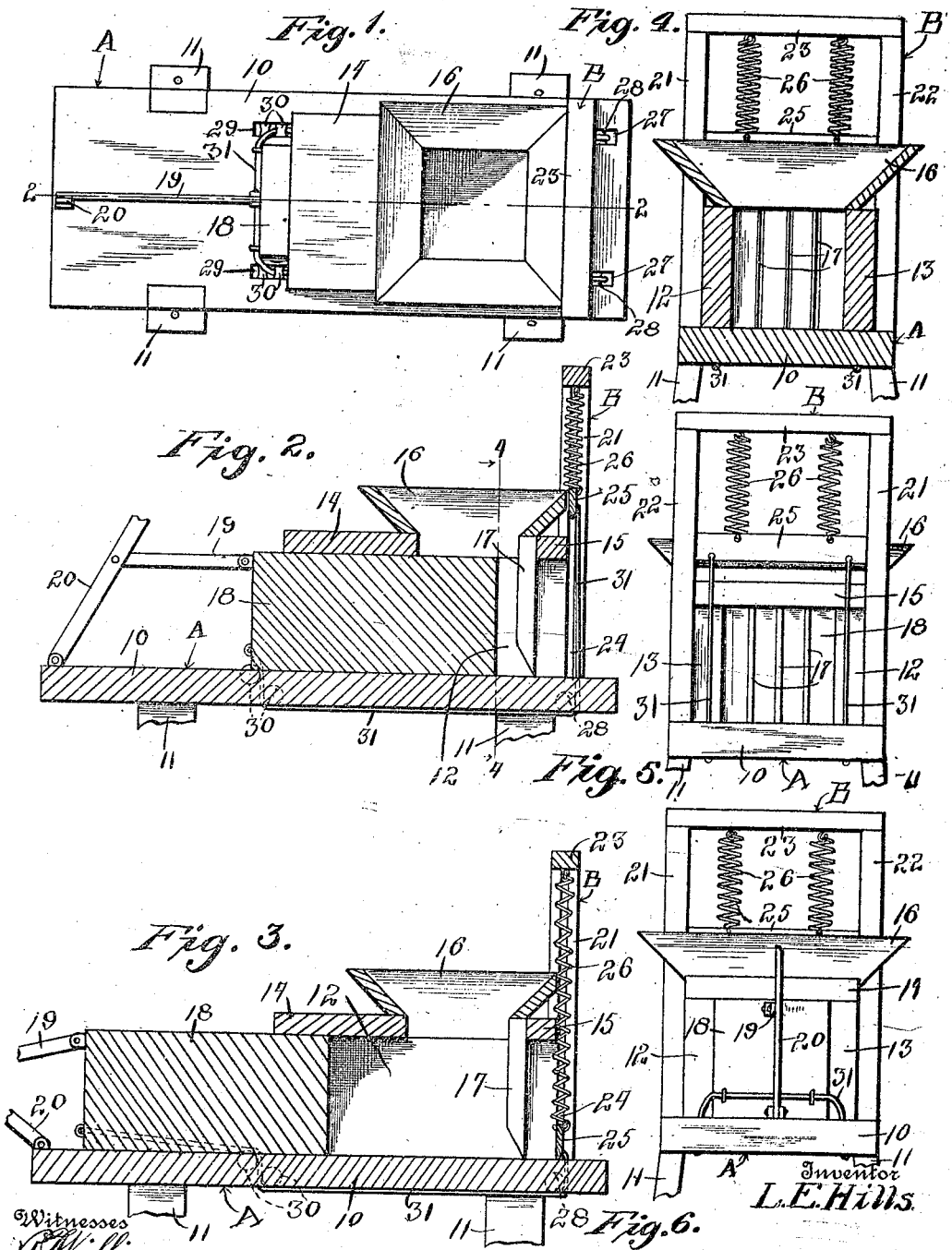

LUNDY E. HILLS, OF ASHCREEK, MINNESOTA.

VEGETABLE-CUTTER.

1,122,501. Specification of Letters Patent. Patented Dec. 29, 1914.

Application filed July 21, 1913. Serial No. 780,377.

*To all whom it may concern:*

Be it known that I, LUNDY E. HILLS, a citizen of the United States, residing at Ashcreek, in the county of Rock, State of Minnesota, have invented certain new and useful Improvements in Vegetable-Cutters; and I do hereby declare the following to be a full, clear, and exact description of the invention, such as will enable others skilled in the art to which it appertains to make and use the same.

This invention relates to vegetable cutters and particularly to a device of this character for cutting potatoes.

The object of the invention resides in the provision of a device of the character named through the instrumentality of which potatoes can be cut with great rapidity, ease and facility.

A further object of the invention resides in the provision of a device of this character which will be simple in construction, efficient in use, and which may be manufactured at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of the invention; Fig. 2, a section on the line 2—2 of Fig. 1; Fig. 3, a view similar to Fig. 2 with the plunger in retracted position; Fig. 4, a section on the line 4—4 of Fig. 2; Fig. 5, a front view of the invention; and Fig. 6, a rear view thereof.

Referring to the drawings the device is shown as comprising a table A which includes a top or slab 10 supported upon legs 11. Mounted upon the top 10 and extending longitudinally of the latter are spaced members 12 and 13 connected together at their upper edges by cross members 14 and 15, said cross members being disposed in spaced relation to each other. Mounted upon the upper edges of the spaced members 12 and 13 between the cross members 14 and 15 and delivering between the members 12 and 13 is a hopper 16.

Secured to the inner edge of the cross member 15 is a plurality of depending vertical knives 17, the cutting edges of said knives being directed toward the cross member 14.

Slidably mounted between the members 12 and 13 is a plunger 18 the rear end of which has pivotally connected thereto one end of a link 19. The other end of this link 19 is pivotally connected to a lever 20 mounted upon the top 10 at the rear of the plunger 18 and whereby the movement of said lever in one direction will draw the plunger away from the knives 17.

Mounted upon the top 10 just forward of the cross member 15 is a frame B which includes vertical side members 21 and 22 connected together at their upper ends by a cross member 23. The adjacent sides of the members 21 and 22 are provided respectively with grooves 24 in which is slidably mounted the terminals of a knife 25 the cutting edge of which extends transversely of the cutting edge of the knives 17. The knife 25 is normally held elevated by means of tension springs 26 which have one end connected to the upper edge of the knife and their other ends to the cross member 23.

Formed in the top 10 adjacent the frame B and in line respectively with the members 12 and 13 are openings 27 in each of which is journaled a pulley 28. Also formed in the top 10 adjacent the ends of the members 12 and 13 remote from the openings 27 are openings 29 in which are journaled pulleys 30 respectively.

Secured to respective ends of the knife 25 are the terminals of a cable 31, which cable is trained over the pulleys 28 and 30 and has its intermediate portion made fast to the rear end of the plunger 18.

By this construction it will be apparent that the springs 26 will operate to normally hold the forward end of the plunger 18 in proximity to the knives 17 and the knife 25 elevated. When the plunger 18 is moved rearwardly through the medium of the lever 20 material will pass from the hopper 16 in front of the plunger and the knife 25 moved downwardly. Upon releasing the lever 20 the plunger 18 will move forwardly and force the material in advance thereof against the knives 17 to effect the cutting of the material by said knives. During this forward movement of the plunger the knife will be elevated and upon the next retraction of the plunger the knife 25 will operate to cut the material previously cut by the knives 17.

What is claimed is:—

In a vegetable cutter, the combination of a support, a casing mounted upon said support and having open ends, a hopper included in the top of said casing, a plunger slidable in the casing, a knife mounted for sliding movement across the advance end of the plunger, spring means normally holding said knife elevated, connections between said spring means and the plunger for normally holding the latter in its advance position, and lever operated means for retracting the plunger against the influence of said spring means.

In testimony whereof, I affix my signature, in the presence of two witnesses.

LUNDY E. HILLS.

Witnesses:
R. J. DUNCOMB,
A. JENSEN.